(12) United States Patent
Xu et al.

(10) Patent No.: US 12,348,444 B2
(45) Date of Patent: Jul. 1, 2025

(54) REFERENCE SIGNAL CONFIGURATION METHOD, NETWORK DEVICE AND TERMINAL DEVICE

(71) Applicant: GUANGDONG OPPO MOBILE TELECOMMUNICATIONS CORP., LTD., Guangdong (CN)

(72) Inventors: Weijie Xu, Guangdong (CN); Shukun Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 245 days.

(21) Appl. No.: 17/817,856

(22) Filed: Aug. 5, 2022

(65) Prior Publication Data

US 2022/0376861 A1    Nov. 24, 2022

Related U.S. Application Data (63) Continuation of application No. PCT/CN2020/074376, filed on Feb. 6, 2020.

(51) Int. Cl.
*H04L 5/00* (2006.01)

(52) U.S. Cl.
CPC .................. *H04L 5/0048* (2013.01)

(58) Field of Classification Search
None
See application file for complete search history.

(56) References Cited

U.S. PATENT DOCUMENTS

| | | | |
|---|---|---|---|
| 11,617,155 B2 * | 3/2023 | Lin | H04L 5/005 370/329 |
| 2014/0036806 A1 * | 2/2014 | Chen | H04L 5/0035 370/329 |
| 2016/0278030 A1 | 9/2016 | Yi et al. | |
| 2019/0149294 A1 | 5/2019 | Pawar et al. | |
| 2020/0059874 A1 * | 2/2020 | Noh | H04L 5/0051 |

FOREIGN PATENT DOCUMENTS

| | | |
|---|---|---|
| CN | 101272608 | 9/2008 |
| CN | 109120566 | 1/2019 |
| CN | 109391424 | 2/2019 |
| CN | 110662252 | 1/2020 |
| CN | 110690947 | 1/2020 |
| EP | 3553978 | 10/2019 |

OTHER PUBLICATIONS

EPO, Extended European Search Report for EP Application No. 20917351.7, Jan. 3, 2023.

(Continued)

*Primary Examiner* — Walter J Divito
(74) *Attorney, Agent, or Firm* — Hodgson Russ LLP (57) ABSTRACT

Disclosed are a reference signal configuration method, a network device, and a terminal device. The method includes: sending configuration information of one or more reference signal through system information and/or paging messages by the network device; receiving configuration information of one or more reference signal through system information and/or paging messages by the terminal device.

17 Claims, 4 Drawing Sheets

(56) References Cited

OTHER PUBLICATIONS

Mediatek Inc., "Efficient Wider Bandwidth Operations for NR," 3GPP TSG RAN WG1 Meeting #88bis, R1-1704445, Apr. 2017.
WIPO, International Search Report and Written Opinion for PCT/CN2020/074376, Oct. 30, 2020.
EPO, Extended European Search Report for EP Application No. 24156442.6, May 13, 2024.
CNIPA, First Office Action for CN Application No. 202311421803.X, Jan. 17, 2025.
CNIPA, Second Office Action for CN Application No. 202311421803.X, May 1, 2025.

* cited by examiner

```
Sending configuration information of one or more reference signals through    21
system information and/or paging messages by a network device
```

FIG. 2

```
Receive configuration information of one or more reference signals through    31
system information and/or paging message by a terminal device
```

First communication unit 51

FIG. 5

Second communication unit 61

Second processing unit 62

REFERENCE SIGNAL CONFIGURATION METHOD, NETWORK DEVICE AND TERMINAL DEVICE

CROSS REFERENCE TO RELATED APPLICATIONS

This application is a continuation of International Patent Application No. PCT/CN2020/074376 filed on Feb. 6, 2020, the entire disclosure of which is incorporated by reference herein.

TECHNICAL FIELD

The present disclosure relates to the field of communication technology, and in particular to a reference signal configuration method, a network device, and a terminal device.

BACKGROUND

In related technologies, for New Radio (NR) terminals in a RRC (Radio Resource Control) idle state or a RRC inactive state, before receiving a broadcast message or a paging messages, the terminal devices may only use Synchronous Signal block (SSB, SS/Physical Broadcast Channel (PBCH) block) to realize synchronization. However, the SS/PBCH has a long period, and the period of the SS/PBCH is at least 5 ms, and typically 10 ms or 20 ms. Thus, before receiving system information or paging messages, the terminals need to receive SS/PBCH dozens or even hundreds of milliseconds in advance to perform a synchronization operation. Therefore, the terminal devices need to perform the synchronization operation dozens or even hundreds of milliseconds in advance before receiving the broadcast message or the paging messages. Such a processing method is not conducive to energy saving of the terminal devices.

SUMMARY

Embodiments of the present disclosure provide a reference signal configuration method, a network device, and a terminal device.

In the first aspect, a reference signal configuration method is provided, including: sending configuration information of one or more reference signal through system information and/or paging messages by a network device.

In the second aspect, a reference signal configuration method is provided, including: receiving configuration information of one or more reference signal through system information and/or paging messages by a terminal device.

In a third aspect, a network device is provided, the network device includes a processor and a memory, the memory is configured to store a computer program, the computer program may be run on the processor, the processor is configured to call and run the computer program stored in the memory to execute any one of above method.

In a fourth aspect, a terminal device is provided, the terminal device includes a processor and a memory, the memory is configured to store a computer program, the computer program may be run on the processor, the processor is configured to call and run the computer program stored in the memory to execute any one of above method.

BRIEF DESCRIPTION OF THE DRAWINGS

FIG. 1-1 is a first schematic view of a communication system architecture according to an embodiment of the present disclosure.

FIG. 1-2 is a schematic view of synchronization processing based on SSB.

DETAILED DESCRIPTION

In order to understand the features and technical contents of embodiments of present disclosure in more detail, the implementation of the embodiments of the present disclosure will be described in detail below with reference to drawings. The drawings are only for reference and description purposes, and are not for limiting the embodiments of the present disclosure.

The technical solutions in the embodiments of the present disclosure will be described below in conjunction with the drawings of the present disclosure. Obviously, described embodiments are a part of the embodiments of the present disclosure, not all of the embodiments. Based on the embodiments in the present disclosure, all other embodiments obtained by those of ordinary skill in the art without creative work shall fall within the scope of the present disclosure.

The technical solutions of the embodiments of the present disclosure can be applied to various communication systems such as Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, and so on.

Figure 11:
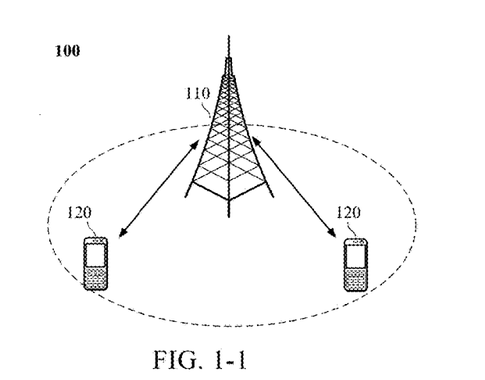

Exemplarily, a communication system 100 in some embodiments of the present disclosure may be as shown in FIG. 1-1. The communication system 100 may include a network device 110, the network device 110 may be a device that communicates with a user equipment (UE) 120 (or called a communication terminal device or a terminal device). The network device 110 may provide communication coverage for a specific geographic area, and may communicate with the UE located in the specific geographic area. Alternatively, the network device 110 may be a network device such as a Base Transceiver Station (BTS) in the GSM system or the CDMA system, a network device such as a Node B (NB) in the WCDMA system, an evolved network device such as an Evolutional Node B (eNB or eNodeB) in the LTE system, a wireless controller in a Cloud Radio Access Network (CRAN). In some embodiments, the network device may also be a mobile switching center, a relay station, an access point, a vehicle-mounted device, a wearable device, a Hub, a switch, a bridge, a router, a network-side device in 5G network, or a network device in a future evolutional Public Land Mobile Network (PLMN), and so on.

The communication system 100 further includes at least one UE 120 located within the coverage area of the network device 110. The "UE" used herein may include, but may not be limited to a device connected via a wireline, such as a Public Switched Telephone Network (PSTN), a Digital Subscriber Line (DSL), a digital cable, or a direct cable connection; and/or another data connection/network; and/or a device connected via a wireless interface such as a cellular network, a Wireless Local Area Network (WLAN), a digital television network such as a DVB-H network, a satellite network, an AM-FM radio transmitter; and/or an apparatus of another UE configured to receive/send communication signals; and/or Internet of Things (IoT) equipment. A UE configured to communicate through the wireless interface may be referred as a "wireless communication terminal device", a "wireless terminal device", or a "mobile terminal device".

Alternatively, a Device to Device (D2D) communication may be performed between a plurality of UEs 120.

Compared with the LTE, 5G New Radio (NR) technology has a distinctive feature of supporting a wider transmission bandwidth, a higher transmission rate, a shorter transmission delay, and more flexible deployment, which is expected to better support various mobile Internet services, and further bring a better user experience. While the 5G technology realizes the above-mentioned technical advantages, however, the 5G technology also brings huge challenges to development and implementation of 5G products. Specifically, 5G terminals support transmission bandwidths of hundreds of MHz, support peak rates of up to tens of Gbps, and support millisecond-level transmission delays, which requires the terminals to have strong software and hardware capabilities, such as wide-bandwidth radio frequency devices such as Power Amplifier (PA), filters, high-speed baseband processors, and so on, and which will bring huge challenges to a power consumption of the 5G terminals. At present, standby and use time of relatively mature LTE terminals is about one day, which may meet use needs of most users. If the power consumption during the standby time of 5G terminals is greatly increased compared to the LTE terminals, the standby time of 5G terminals is greatly shortened, which will be difficult to meet the basic needs of users. On the other hand, an increase in the power consumption of the terminals also brings other potential problems. For example, when the terminals are overheated due to high power consumption, the terminals need to be equipped with a high-end heat sink, which increases the cost of the terminals and squeezes narrow design space inside the terminals. Above factors are not conducive to the industrialization of the 5G terminals.

On the other hand, in mobile communication terminals, other modules such as touch screens, fingerprint recognition modules, image modules, etc. are moving towards low power consumption. Therefore, as the power consumption of these modules decreases, a proportion of a power consumption of communication modules in the entire terminals will be relatively increased.

Therefore, 3rd Generation Partnership Project (3GPP) has carried out research and standardization work on energy saving of the NR terminals. In 3GPP Release 16, the 3GPP designed energy-saving mechanisms, such as wake-up mechanism, cross-slot scheduling, and sleep operation of secondary cell (scell), for the energy saving of the terminals. Since these technologies are energy-saving optimization for terminals working in a Radio Resource Control (RRC) connected state, in 3GPP Release 17, various companies recommend energy-saving technologies for the terminals in a RRC idle state and a RRC inactive state.

It should be understood that the terms "system" and "network" in the present disclosure are often used interchangeably in the present disclosure. The term "and/or" in the present disclosure is only an association relationship describing the associated objects, which means that there can be three kinds of relationships; for example, A and/or B can mean three situations including: A exists alone, A and B exist simultaneously, and B exists alone. In addition, the character "/" in the present disclosure generally indicates that associated objects before and after this character are in an "or" relationship.

In order to have a more detailed understanding of features and technical content of the embodiments of the present disclosure, the implementation of the embodiments of the present disclosure will be described in detail below with reference to the drawings. The drawings are only used for reference and description purposes, and are not used for limiting the embodiments of the present disclosure.

Figure 12:
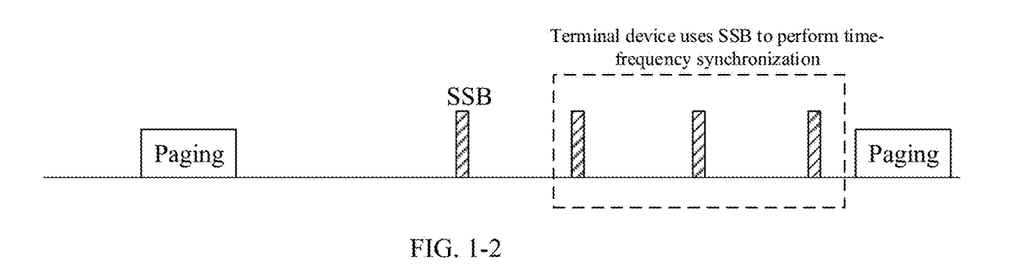

In an NR system, in the RRC idle state and the RRC inactive state, there is no continuously-transmitted reference signal like Cell Reference Signal (CRS) in the LTE. Before receiving system information, paging messages, and other signals, the terminals need to obtain coarse time-frequency synchronization and fine time-frequency synchronization by relying on or according to the Primary Synchronization Signal/Secondary Synchronization Signal (PSS/SSS) (and Physical Broadcast Channel (PBCH) Demodulation Reference Signal (DMRS)) in periodically-transmitted Synchronization Signal (SS)/PBCH. In this way, in general, the terminals need to receive several SS/PBCH blocks to meet the requirements of the fine time-frequency synchronization. For example, as shown in FIGS. 1-2, the SS/PBCH has the long period which is at least 5 ms, and typically 10 ms or 20 ms. In this way, before receiving the system information or the paging messages, the terminals need to receive SS/PBCH dozens or even hundreds of milliseconds in advance, to perform the synchronization operations. Therefore, the terminal s need to wake up tens or even hundreds of milliseconds before receiving broadcast or the paging messages to perform the synchronization operations, which is obviously not conducive to the energy saving of the terminals.

Figure 2:
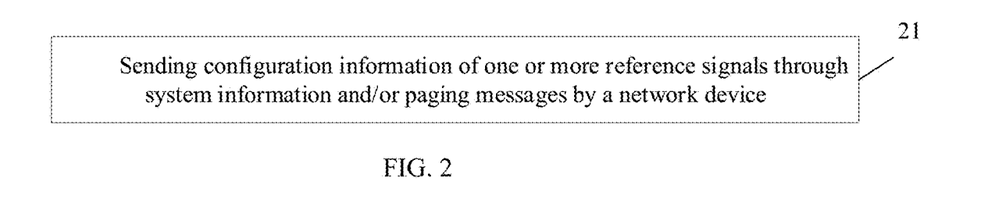
FIG. 2 is a first schematic flowchart of a reference signal configuration method according to an embodiment of the present disclosure.

Therefore, in some embodiments of the present disclosure, a reference signal configuration method may be provided. As shown in FIG. 2, the reference signal configuration method may include the following operations.

In an operation 21, the network device may send configuration information of one or more reference signal through system information and/or paging messages.

Figure 3:
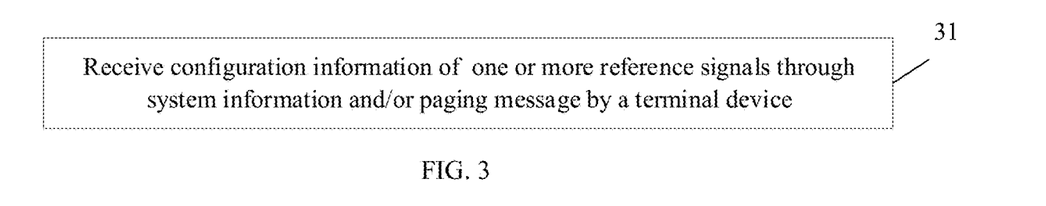
FIG. 3 is a second schematic flowchart of a reference signal configuration method according to an embodiment of the present disclosure.

In some embodiments of the present disclosure, another reference signal configuration method may also be provided. As shown in FIG. 3, the reference signal configuration method may include the following operations.

In an operation 31, a terminal device may receive the configuration information of the one or more reference signal through the system information and/or the paging messages.

In some embodiments of the present disclosure, the reference signal is Channel-state information (CSI)-Reference Signal (RS).

Moreover, in some embodiments, the one or more the reference signal is configured for time-frequency synchronization. Specifically, the one or more the reference signal is configured for the time-frequency synchronization of the terminal device.

It should be noted that, in some embodiments, the terminal device may be in the RRC idle state or the RRC inactive state.

That is, in the related art, the network device may send the CSI-RS to the terminal device in the RRC connected state, and may send different CSI-RS signals to different terminals. In this way, in case that the CSI-RS in the related art may also be used for the terminal device in the RRC idle state or the RRC inactive state, available reference signals of a NR UE in the RRC idle state or the RRC inactive state may be increased, such that time required for the time-frequency synchronization of the terminal device may be potentially reduced, thereby saving energy of the terminal device. Therefore, this embodiment mainly provides a corresponding processing solution for adding or increasing the above-mentioned signals configured for the terminal device to achieve the time-frequency synchronization.

Figure 4:
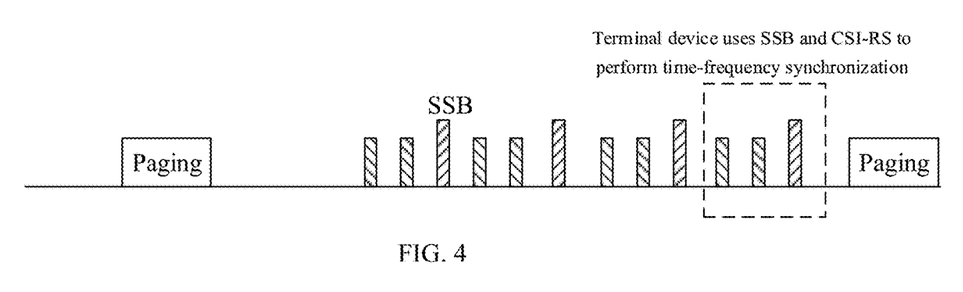
FIG. 4 is a schematic view of a processing scenario of synchronization based on SSB and CSI-RS according to an embodiment of the present disclosure.

For further analysis, as shown in FIG. 4, the terminal device may also use an additional reference signal, such as the CSI-RS for the time-frequency synchronization in addition to a synchronization signal block (SSB). In this case, the terminal device may use enough reference signals CSI-RS and the SSB in a shorter time to achieve the synchronization, thereby achieving the energy saving.

In general, the technical solution provided in this embodiment may include several examples including: sending the configuration information of the reference signal through the system information, sending the configuration information of the reference signal through the paging messages, and indicating the configuration information of a corresponding reference signal through the combination of the system information and the paging messages. The examples are described below.

Example 1, the system information may be used to send the configuration information of the reference signal.

That is, the configuration information of the one or more reference signal is carried by a System Information Block (SIB) of the system information.

The technical solution of the Example 1 may be understood as follow. The network device may be configured to carry the configuration information of the one or more reference signal through the SIB in the system information and send the configuration information of the one or more reference signal to the terminal device.

Correspondingly, the terminal device may be configured to receive the system information, and obtain the configuration information of the one or more reference signal carried by the SIB of the system information.

The terminal device may be further configured to determine the one or more reference signal according to the configuration information of the one or more reference signal.

The terminal device may be further configured to perform the time-frequency synchronization according to the SSB and/or the one or more reference signal.

In the technical solution provided in the example 1, a manner that the network device determines the configuration information of the one or more reference signal may include the following operations.

The network device may use the configuration information of all reference signals (that is, CSI-RSs) corresponding to all terminal devices currently in the connected state as the configuration information of the one or more reference signal. In other words, for example, when ten of the terminal devices connected to the network device are in the connected state, the network device sends the configuration information of the CSI-RSs corresponding to the ten of the terminal devices to the terminal devices in the idle state or the inactive state through the system information.

Alternatively, the network device selects a part of the configuration information of the reference signal as the configuration information of the one or more reference signal from the configuration information of all the reference signals (that is, the CSI-RSs) corresponding to all the terminal devices currently in the connected state. In other words, the network device may select a part of the configuration information of the CSI-RSs corresponding to all the terminal devices currently in the connected state and send the part of the configuration information of the CSI-RSs to the terminal devices in the idle state or in the inactive state through the system information. The part of the configuration information of the CSI-RSs may be selected randomly and according to a given rule. The given rule may be understood as relatively fixed. For example, in case that ten configuration information of the CSI-RSs exist currently and seven of the ten configuration information of the CSI-RSs only appear in this time and have a short occurrence time, then the seven configuration information of the CSI-RSs may be excluded, and the remaining three configuration information of the CSI-RSs are sent to the terminal devices in the idle state or the inactive state.

In other words, in the example 1, the network device may be configured to notify the configuration information of the reference signal in the system information. Since a system may configure and send the CSI-RSs to multiple terminal devices in the connected state at the same time, the network device may send the configuration information of the CSI-RSs in the system information and corresponding to the terminal devices in the connected state to the UE. Alternatively, the system may send the configuration information of one or more CSI-RSs in the system information and corresponding to a certain or a certain part of terminal devices in the connected state to the UE.

In this way, the terminal devices in the RRC idle state or the RRC inactive state may use the CSI-RS to achieve the time-frequency synchronization.

Moreover, in the example 1, the SIB in the system information may be SIB1, SIB2, and so on in the existing system information. Alternatively, the SIB in the system information may be a single SIB message, and the single SIB message may be a new SIB dedicated to transmitting the configuration information of the reference signal.

In addition, since the number of the terminal devices in the connected state at different moments may change, corresponding transmitted CSI-RSs may also change. Therefore, at different times, the configuration information of the CSI-RSs sent to the terminal devices in the RRC idle state or the RRC inactive state may also change. Then the technical solution provided by the example 1 may also include the following operations.

In response to the configuration information of the one or more reference signal changing, the network device sends updated system information to the terminal device. The updated system information includes changed configuration information of the one or more reference signal.

Correspondingly, the terminal device may receive the updated system information sent by the network device. The updated system information includes the changed configuration information of the one or more reference signal.

Further, the terminal device may be configured to re-determine one or more reference signal according to the changed configuration information of the one or more reference signal included in the updated system information, and then perform the time-frequency synchronization according to the one or more changed reference signal and/or the SSB.

In the example 1, the terminal device may only use the SSB for the time-frequency synchronization, which will not be repeated again. Alternatively, the terminal device may also only use the CSI-RS for the time-frequency synchronization. Alternatively, the terminal device may also use both the CSI-RS and the SSB for the time-frequency synchronization, in this way, the signals used for time-frequency synchronization may be increased, thereby speeding up the performing of the time-frequency synchronization, and in turn reducing the power consumption of the terminals.

That is to say, since the configuration information of the CSI-RS is carried in the system information, the system information will change with the change of the configuration information. In this case, an update mechanism for the system information may be configured to achieve change of the system information, and the update mechanism for the system information will not be described in detail.

Example 2, the paging messages may be used to send the configuration information of the reference signal.

The configuration information of the one or more reference signal is carried by a first channel carrying the paging messages.

The first channel is a Physical Downlink Shared Channel (PDSCH) or a Physical Downlink Control Channel (PDCCH).

The technical solution of the example 2 may be understood as: the network device may be configured to carry the configuration information of the one or more reference signal through the first channel carrying the paging messages and send the configuration information of the one or more reference signal to the terminal device.

Correspondingly, the terminal device may receive the configuration information of the one or more reference signal carried in the first channel carrying the paging messages.

The terminal device may be configured to determine the one or more reference signal according to the configuration information of the one or more reference signal.

The terminal device may be configured to perform the time-frequency synchronization according to the SSB and/or the one or more reference signal.

In the example 2, the first channel carrying the paging messages may be the PDSCH or the PDCCH.

In the example 2, the network device may initiate paging to the terminal device in the idle state, the inactive state, or the connected state. The paging messages may be carried on the PDSCH. The terminal device needs to receive the PDCCH first, and receives the PDSCH through information obtained from the PDCCH to demodulate the PDSCH, so as to receive the paging messages and the configuration information of the reference signal from the PDSCH.

Alternatively, the PDCCH may also carry both the configuration information of the reference signal and scheduling information of the paging messages. In this way, the terminal device may receive the paging messages and the configuration information of the reference signal by only receiving the PDCCH, thereby saving the power consumption of the terminal device.

In other words, the network device may use the paging messages to send the configuration information of the reference signal. The network device may page up to at most 16 terminal devices. The configuration information of the one or more CSI-RSs may be carried in a PDSCH carrying the paging messages.

Further, the method may further include the following operations: the network device may be configured to send second indication information to the terminal device, and the second indication information is configured to indicate state information corresponding to the configuration information of the one or more reference signal.

Correspondingly, the terminal device may be configured to receive the second indication information sent by the network device.

The state information includes the following.

The state information may include information about whether the configuration information of the one or more reference signal is carried in the first channel.

And/or, the state information may include information about whether the configuration information of one or more reference signal carried by the first channel has changed.

The second indication information is carried by a Downlink Control Information (DCI) carried by the PDCCH of the first channel, and the PDCCH of the first channel is configured to schedule the paging messages.

That is, the second indication information in the DCI carried by the PDCCH configured to schedule the paging messages may indicate some states of the configuration information of the CSI-RS reference signal. For example, the second indication information in the DCI may indicate whether the configuration information of the CSI-RS reference signal is carried by the PDSCH; and/or the second indication information in the DCI may indicate whether the configuration information of the CSI-RS reference signal carried in the PDSCH has changed.

Whether the configuration information of the one or more reference signal has changed may be understood as whether the configuration information of the one or more reference signal has at least partially changed in comparison with the configuration information carried in a previous paging message.

Further, the concept that the configuration information of the one or more reference signal changes may be understood as: configuration information of new reference signal appears compared with the previous paging message, and/or compared with the previous paging message, configuration information of an original reference signal has changed. Of course, there may be more concepts that the configuration information of the one or more reference signal changes, which will not be listed in detail.

For example, configuration information of reference signal 1, configuration information of reference signal 2, and configuration information of reference signal 3 are carried in paging message 1. Before sending paging message 2, in response to determining that the paging message 2 carries the configuration information of one or more reference signal, the network device may send the second indication information through the PDCCH DCI for indication.

And/or, before sending the paging message 2, in response to determining that the configuration information of the reference signal 1 has changed, or determining that new configuration information of the reference signal 4 appears, a content relative to the paging message 1 has also changed, and the second indication information may be sent through the PDCCH DCI to indicate that the configuration information has changed.

Compared with the example 1, a significant advantage of using the paging messages to send the configuration information of the reference signal in the example 2 is that the terminal device in the RRC idle state or the RRC inactive state needs to monitor the paging messages at paging moment. Therefore, the terminal device may obtain the configuration information of the reference signal while monitoring the paging messages, such that ensure that a process of obtaining the configuration information will not increase additional power consumption of the terminal device.

Example 3, the system information and the paging messages may be used to send the configuration information of the reference signal.

The operation of sending configuration information of one or more reference signal to the terminal device through system information and/or paging messages by the network device may include the following operations.

The network device may send configuration information of one or more candidate reference signal to the terminal device through the system information; and the network device sends the first indication information to the terminal device through the paging messages.

The first indication information is configured to indicate an available reference signal or an unavailable reference signal in the candidate reference signal, and the available reference signal is the one or more reference signal sent by the network device to the terminal device.

Correspondingly, the terminal device may receive the configuration information of the one or more candidate reference signal sent by the network device through the system information.

The terminal device may receive the first indication information sent by the network device through the paging messages, and the first indication information is configured to indicate the available reference signal or the unavailable reference signal in the candidate reference signal.

Further, the terminal device may determine the one or more reference signal according to the configuration information of the available reference signal. The terminal device may determine the one or more reference signal according to the configuration information of the one or more reference signal, and may perform the time-frequency synchronization according to the synchronization signal block SSB and/or the one or more reference signal.

The network device sends the one or more configuration information of the CSI-RS in the system information, and the one or more configuration information of the CSI-RS may be understood as the configuration information of the one or more candidate reference signal.

The one or more CSI-RS (i.e., candidate reference signal) may be the CSI-RS sent to the terminal device currently in the RRC connected state in the system. The one or more CSI-RS may also be CSI-RS pre-selected by the network and potentially sent to the terminal device in the RRC connected state during a future period of time, that is, in response to a terminal device accessing the system and being in the RRC connected state, the network may select one CSI-RS from the pre-selected CSI-RS and send the selected CSI-RS to the terminal.

The configuration information of the candidate reference signal may be a set, and the set includes the configuration information of the one or more candidate reference signal.

In addition, related description of the system information in the example 3 is the same as that in the example 1, which will not be repeated.

The first indication information may include at least one of the following contents:

the available reference signal in the candidate reference signal;

the unavailable reference signal in the candidate reference signal; and a duration of use of the available reference signal.

Specifically, in response to the first indication information including only the available reference signal, the remaining candidate reference signal may be defaulted to be the unavailable reference signal. In response to the first indication information including only the unavailable reference signal, the remaining candidate reference signal may be defaulted to be the available reference signal. In response to the first indication information including only the duration of use is included in the first indication information, all the candidate reference signals may be regarded as the available reference signals.

Moreover, in response to the first indication information including only the available reference signal, the duration of use of the available reference signal may be preset, or the network device may indicate through other information; or, the duration of use of the reference signal may be from a time point at which the terminal device receives the first indication information to a time point at which the terminal device receives a next paging message carrying the configuration information of the reference signal.

In other words, the network device may send state information of the CSI-RS configured by the system information to the terminal device through the paging messages. For example, the state information of the CSI-RS may include: which CSI-RSs are currently available (that is, being transmitted by the network), which CSI-RSs are not available (that is, not being transmitted by the network), or how long a transmission duration of the available CSI-RS lasts in the future.

Specifically, the first indication information includes a bitmap including at least one bit.

Every bit in the bitmap is configured to indicate whether a corresponding one of the one or more candidate reference signal is the available reference signal or the unavailable reference signal, respectively.

It may be understood that the first indication information includes the bitmap, and which bit in the bitmap corresponds to which candidate reference signal may be determined according to a preset rule.

The preset rule may be: in response to the candidate reference signals being numbered, the bits in the bitmap may correspond to the numbers of the candidate reference signals from small to large (or from large to small) according to an order from top to bottom or from left to right.

Alternatively, in response to the candidate reference signal having no numbers, the candidate reference signal may be arrayed according to a receiving order, and correspond to the bits in the bitmap from top to bottom or from left to right in one-to-one correspondence.

Alternatively, one bit may correspond to multiple candidate reference signals, but similarly, different bits correspond to different candidate reference signals.

A first value of the bit may be set to 1, and a second value of the bit may be set to 0. Of course, the first value of the bit may also be set to 0, and the second value of the bit may also be set to 1, as long as the network device and the terminal device set same value, which will not be repeated here.

The first indication information is carried by the DCI carried by the PDCCH of the first channel configured to schedule the paging messages.

Alternatively, the first indication information may be carried by the first channel configured to carry the paging messages.

The first channel is the physical downlink shared channel PDSCH or the physical downlink control channel PDCCH. The description of the first channel may refer to the example 2, which will not be repeated here.

For example, the network carries a bitmap in the PDCCH DCI that schedules the paging messages or in the PDSCH that carries the paging messages. The bitmap includes one or more bits, and each bit corresponds to one or more of the CSI-RS configured in the system information. In response to one bit in the bitmap having a value of "1", it indicates that the candidate CSI-RS corresponding to the bit is available. Otherwise, in response to the bit having a value of "0", it indicates that the candidate CSI-RS corresponding to the bit is unavailable.

The PDCCH DCI or the PDSCH may further carry information about the transmission duration (or the duration of use) of the available CSI-RS during the future period of time.

The future period of time may be a future period of time set according to actual conditions.

The transmission duration or the duration of use may be: how many paging cycles or system frames (SFNs) may last, and so on.

Combining with further analysis of the example 3, actually, the terminal device in the RRC idle state or the RRC inactive state "borrows" the CSI-RS sent by the network to the terminal device in the RRC connected state, such that the network will not additionally send the CSI-RS to the terminal device in the RRC idle state or the RRC inactive state, thereby saving the load of the network. The technical solution provided in the example 3 may enable the system information to carry the configuration information of one or more CSI-RSs reference signal. The CSI-RS reference signal may be used by the UE currently in the RRC connected state, or may be used by the UE connected in the future and in the RRC connected state. Therefore, through reasonable configuration of the network, the CSI-RS in the system information do not need to be changed for a long period of time, which will not cause frequent update of the system information. On the other hand, according to the CSI-RS sent by the system to the UE currently in the RRC connected state, the network indicates the available CSI-RS in the paging messages in real time, so as to match the situation of the currently sent CSI-RS. In addition, simplified indication method of bitmap may be configured in the paging messages, the simplified indication method of bitmap has characteristics of low cost and convenient indication.

For the example 1-3, part of signaling about CSI-RS configuration may be as follows, and the CSI-RS configuration includes at least one of the following.

CSI-resource configuration information defines a resource set including one or more Non-Zero-Power (NZP)-CSI-RS-resource sets, CSI-Interference Measurement (IM)-resource sets, and/or CSI-SSB-resource sets, for example, "

```
    i-ResourceConfigId                          CSI-ResourceConfigId,
      csi-RS-ResourceSetList                    CHOICE {
       nzp-CSI-RS-SSB                             SEQUENCE {
         nzp-CSI-RS-ResourceSetList                 SEQUENCE (SIZE
    (1..maxNrofNZP-CSI-RS-ResourceSetsPerConfig)) OF NZP-CSI-RS-ResourceSetId".
```

The CSI-RS configuration may also include CSI-RS resource mapping which is configured to configure a time-frequency resource of the CSI-RS, the number of antenna ports, resource density and other information:

```
    -- ASN1START
    -- TAG-CSI-RS-RESOURCEMAPPING-START
    CSI-RS-ResourceMapping ::=                  SEQUENCE {
     frequencyDomainAllocation                   CHOICE {
      row1                                        BIT STRING (SIZE (4)),
      row2                                        BIT STRING (SIZE (12)),
      row4                                        BIT STRING (SIZE (3)),
      other                                       BIT STRING (SIZE (6))
     },
     nrofPorts                                   ENUMERATED
    {p1,p2,p4,p8,p12,p16,p24,p32},
     firstOFDMSymbolInTimeDomain                 INTEGER (0..13),
     firstOFDMSymbolInTimeDomain2                INTEGER (2..12)
    OPTIONAL, -- Need R
     cdm-Type                                    ENUMERATED {noCDM,
    fd-CDM2, cdm4-FD2-TD2, cdm8-FD2-TD4},
     density                                     CHOICE {
      dot5                                        ENUMERATED
    {evenPRBs, oddPRBs},
      one                                         NULL,
      three                                       NULL,
```

```
  spare                           NULL
 },
 freqBand                         CSI-FrequencyOccupation,
 ...
}
```

Herein, "frequencyDomainAllocation" is configured to indicate a frequency domain allocation, "firstOFDMSymbolInTimeDomain" is configured to indicate time domain (that is, time domain OFDM symbol) allocation, and "density" field is configured to indicate a resource density. In addition, this element may also include a content such as the frequency band "freqBand", which will not be repeated here.

It can be seen that, in the technical solution provided in this embodiment, the network device may configure the configuration information of the reference signal for the terminal device, and the configuration information is sent through the paging messages and/or the system information. In this way, the reference signal only sent to the terminal device in the connected state originally may be borrowed to increase signals for the time-frequency synchronization for the terminal device, thereby speeding up the speed at which the terminal device realizes the time-frequency synchronization, and in turn being conducive to the energy saving of the terminal device. In addition, since the configuration information may be sent by combining the paging messages and the system information in this embodiment, the technical solution provided in this embodiment further has the low instruction cost and the flexible and convenient way of sending instructions, in addition to facilitating the energy saving of the terminal device.

Figure 5:
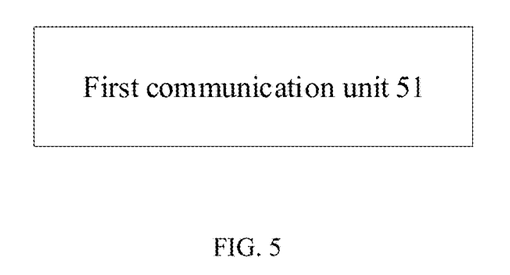
FIG. 5 is a schematic view of a configuration of a network device according to an embodiment of the present disclosure.

An embodiment of the present disclosure provides a network device, as shown in FIG. 5, the network device includes a first communication unit 51.

The first communication unit 51 may be configured to send the configuration information of the one or more reference signal through the system information and/or the paging messages.

Figure 6:
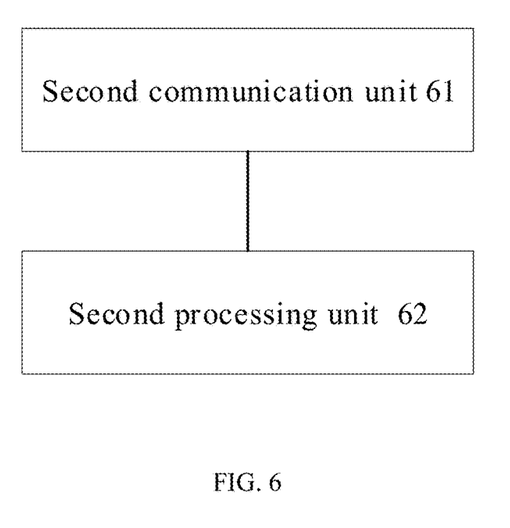
FIG. 6 is a schematic view of a configuration of a terminal device according to an embodiment of the present disclosure.

An embodiment of the present disclosure provides a terminal device, as shown in FIG. 6, the terminal device includes a second communication unit 61.

The second communication unit 61 is configured to receive the configuration information of the one or more reference signal through the system information and/or the paging messages.

In some embodiments, the one or more reference signal is the CSI-RS.

Furthermore, in some embodiments, the one or more reference signal is configured for the time-frequency synchronization. Specifically, the one or more reference signal is configured for the time-frequency synchronization of the terminal device.

It should be noted that, in some embodiments, the terminal device may be in the RRC idle state or the RRC inactive state.

In general, the technical solution provided in this embodiment may include several examples including: sending the configuration information of the reference signal via the system information, sending the configuration information of the reference signal via the paging messages, and indicating the configuration information of a corresponding reference signal via the combination of the system information and the paging messages. The examples are described below.

Example 1, the system information may be used to send the configuration information of the reference signal.

That is, the configuration information of the one or more reference signal is carried by the SIB of the system information.

The technical solution of the Example 1 may be understood as follow. The first communication unit 51 of the network device may be configured to carry the configuration information of the one or more reference signal through the SIB in the system information and send the configuration information of the one or more reference signal to the terminal device.

Correspondingly, the second communication unit 61 of the terminal device may be configured to receive the system information, and obtain the configuration information of the one or more reference signal carried by the SIB of the system information.

The terminal device may further include the second processing unit 62. The second processing unit 62 may be configured to determine the one or more reference signal according to the configuration information of the one or more reference signal, and perform the time-frequency synchronization according to the SSB and/or the one or more reference signal.

Moreover, in the example 1, the SIB in the system information may be SIB1, SIB2, and so on in the existing system information. Alternatively, the SIB in the system information may be a single SIB message, and the single SIB message may be a new SIB dedicated to transmitting the configuration information of the reference signal.

In addition, since the number of the terminal devices in the connected state at different moments may change, corresponding transmitted CSI-RSs may also change. Therefore, at different times, the configuration information of the CSI-RSs sent to the terminal devices in the RRC idle state or the RRC inactive state may also change. Then the technical solution provided by the example 1 may also include the following operations.

In response to the configuration information of the one or more reference signal changing, the first communication unit 51 of the network device sends updated system information to the terminal device. The updated system information includes changed configuration information of the one or more reference signal.

Correspondingly, the second communication unit 61 of the terminal device may receive the updated system information. The updated system information includes the changed configuration information of the one or more reference signal.

Further, the second processing unit 62 of the terminal device may be configured to re-determine one or more reference signal according to the changed configuration information of the one or more reference signal included in the updated system information, and then perform the time-frequency synchronization according to the one or more changed reference signal and/or the SSB.

That is to say, since the configuration information of the CSI-RS is carried in the system information, the system information will change with the change of the configuration information. In this case, an update mechanism for the system information may be configured to achieve change of the system information, and the update mechanism for the system information will not be described in detail.

Example 2, the paging messages may be used to send the configuration information of the reference signal.

The configuration information of the one or more reference signal is carried by the first channel carrying the paging messages.

The first channel is the PDSCH or the PDCCH.

The technical solution of the example 2 may be understood as: the first communication unit 51 of the network device may be configured to carry the configuration information of the one or more reference signal through the first channel carrying the paging messages and send the configuration information of the one or more reference signal to the terminal device.

Correspondingly, the second communication unit 61 of the terminal device may receive the configuration information of the one or more reference signal carried in the first channel carrying the paging messages.

The second processing unit 62 of the terminal device may be configured to determine the one or more reference signal according to the configuration information of the one or more reference signal, and perform the time-frequency synchronization according to the SSB and/or the one or more reference signal.

In the example 2, the first channel carrying the paging messages may be the PDSCH or the PDCCH.

Further, the first communication unit 51 of the network device may be configured to send second indication information, and the second indication information is configured to indicate state information corresponding to the configuration information of the one or more reference signal.

Correspondingly, the second communication unit 61 of the terminal device may be configured to receive the second indication information.

The state information includes the following.

The state information may include information about whether the configuration information of the one or more reference signal is carried in the first channel.

And/or, the state information may include information about whether the configuration information of one or more reference signal carried by the first channel has changed.

The second indication information is carried by the DCI carried by the PDCCH of the first channel, and the PDCCH of the first channel is configured to schedule the paging messages.

Example 3, the system information and the paging messages may be used to send the configuration information of the reference signal.

The first communication unit 51 of the network device may send the configuration information of the one or more candidate reference signal through the system information, and sends the first indication information to the terminal device through the paging messages.

The first indication information is configured to indicate the available reference signal or the unavailable reference signal in the candidate reference signal, and the available reference signal is the one or more reference signal sent by the network device.

Correspondingly, the second communication unit 61 of the terminal device may receive the first indication information sent by the network device through the paging messages, and the first indication information is configured to indicate the available reference signal or the unavailable reference signal in the candidate reference signal.

Further, the terminal device may determine the one or more reference signal according to the configuration information of the available reference signal. The terminal device may determine the one or more reference signal according to the configuration information of the one or more reference signal, and may perform the time-frequency synchronization according to the synchronization signal block SSB and/or the one or more reference signal.

The network device sends the one or more configuration information of the CSI-RS in the system information, and the one or more configuration information of the CSI-RS may be understood as the configuration information of the one or more candidate reference signal.

The first indication information may include at least one of the following contents:

the available reference signal in the candidate reference signal;

the unavailable reference signal in the candidate reference signal; and the duration of use of the available reference signal.

Specifically, the first indication information includes the bitmap including the at least one bit.

Every bit in the bitmap is configured to indicate whether the corresponding one of the one or more candidate reference signal is the available reference signal or the unavailable reference signal, respectively.

The first value of the bit may be set to 1, and the second value of the bit may be set to 0. Of course, the first value of the bit may also be set to 0, and the second value of the bit may also be set to 1, as long as the network device and the terminal device set same value, which will not be repeated here.

The first indication information is carried by the DCI carried by the PDCCH of the first channel configured to schedule the paging messages.

Alternatively, the first indication information may be carried by the first channel configured to carry the paging messages.

It can be seen that, in the technical solution provided in this embodiment, the network device may configure the configuration information of the reference signal for the terminal device, and the configuration information is sent through the paging messages and/or the system information. In this way, the reference signal only sent to the terminal device in the connected state originally may be borrowed to increase signals for the time-frequency synchronization for the terminal device, thereby speeding up the speed at which the terminal device realizes the time-frequency synchronization, and in turn being conducive to the energy saving of the terminal device. In addition, since the configuration information may be sent by combining the paging messages and the system information in this embodiment, the technical solution provided in this embodiment further has the low instruction cost and the flexible and convenient way of sending instructions, in addition to facilitating the energy saving of the terminal device.

Figure 7:
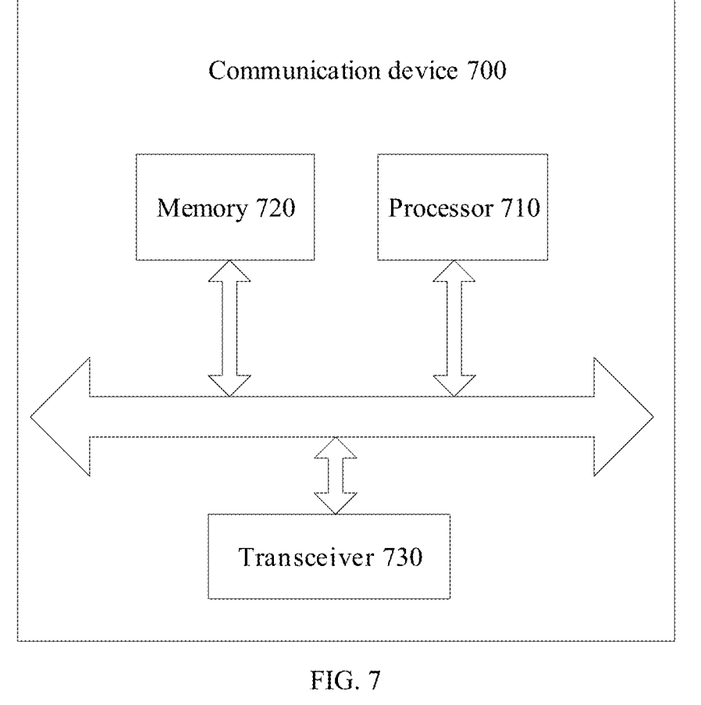
FIG. 7 is a schematic view of a configuration of a communication device according to an embodiment of the present disclosure.

FIG. 7 is a schematic view of a configuration of a communication device according to an embodiment of the present disclosure. The communication device in this embodiment may be specifically one of the terminal device and the network device in foregoing embodiments. The communication device 700 shown in FIG. 7 includes a processor 710, and the processor 710 may call and run a computer program from a memory to implement the method described in some embodiments of the present disclosure.

Alternatively, as shown in FIG. 7, the communication device 700 may also include a memory 720. The processor 710 may call and run a computer program from the memory 720 to implement the method described in some embodiments of the present disclosure.

The memory 720 may be a separate device independent of the processor 710. Alternatively, the memory 720 may also be integrated in the processor 710.

Alternatively, as shown in FIG. 7, the communication device 700 may further include a transceiver 730, and the processor 710 may control the transceiver 730 to communicate with other devices. Specifically, the transceiver 730 may send information or data to the other devices, or receive information or data sent by the other device.

The transceiver 730 may include a transmitter and a receiver. The transceiver 730 may further include one or more antennas.

Alternatively, the communication device 700 may specifically be the network device in the embodiments of the present disclosure, and the communication device 700 may implement corresponding processes implemented by the network device in each method of the embodiments of the present disclosure. For brevity, details of the corresponding process are not repeated here.

Alternatively, the communication device 700 may specifically be the terminal device or the network device in some embodiments of the present disclosure, and the communication device 700 may implement corresponding processes implemented by the terminal device or the terminal device in each method of this embodiment of the present disclosure. For brevity, details of the corresponding process are not repeated here.

Figure 8:
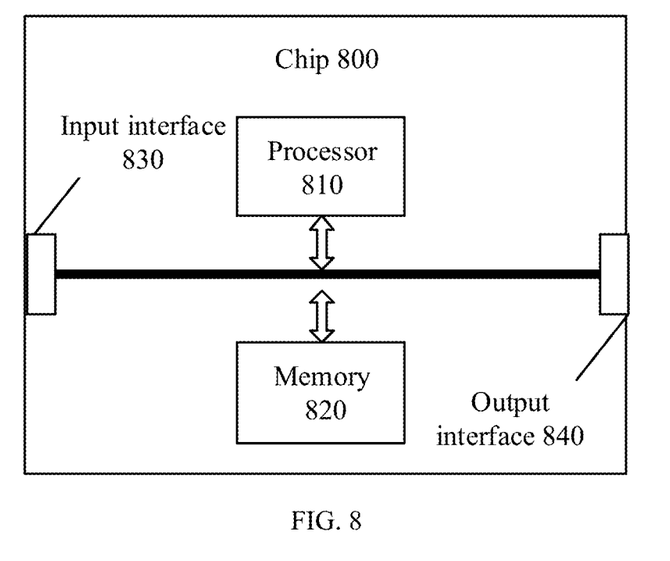
FIG. 8 is a schematic block diagram of a chip according to an embodiment of the present disclosure.

FIG. 8 is a schematic block view of a chip according to an embodiment of the present disclosure. The chip 800 shown in FIG. 8 includes a processor 810, and the processor 810 may call and run a computer program from a memory to implement a method in some embodiments of the present disclosure.

Alternatively, as shown in FIG. 8, the chip 800 may further include a memory 820. The processor 810 may call and run a computer program from the memory 820 to implement the method in some embodiments of the present disclosure.

The memory 820 may be a separate device independent of the processor 810. Alternatively, the memory 820 may be integrated in the processor 810.

Alternatively, the chip 800 may further include an input interface 830. The processor 810 may control the input interface 830 to communicate with other devices or chips. Specifically, the input interface 830 may obtain information or data sent by the other devices or chips.

Alternatively, the chip 800 may further include an output interface 840. The processor 810 may control the output interface 840 to communicate with other devices or chips. Specifically, the output interface 840 may output information or data to the other devices or chips.

Alternatively, the chip may be applied to one of the terminal device, an access network node, and a core network device in some embodiments of the present disclosure. The chip may implement corresponding processes implemented by the terminal device in each method of this embodiment of the present disclosure. For brevity, the corresponding process will not be repeated here.

It should be understood that the chip mentioned in this embodiment of the present disclosure may also be referred to as a system on chip, a system chip, a chip system, or a system-on-chip chip.

It should be understood that the processor in the embodiments of the present disclosure may be an integrated circuit chip with signal processing capability. In implementation process, operations of foregoing method embodiments may be completed by hardware integrated logic circuits or instructions in form of software in the processor. The processor may be a general-purpose processor, a Digital Signal Processor (DSP), an Application Specific Integrated Circuit (ASIC), a Field Programmable Gate Array (FPGA) or other programmable logic devices, discrete gates or transistors Logic devices, discrete hardware components. The processor may implement and executed the methods, steps, and logical block diagrams disclosed in the embodiments of the present disclosure. The general-purpose processor may be a microprocessor or any conventional processor, and so on. The operations of the method disclosed in the embodiments of the present disclosure may be directly executed and completed by a hardware decoding processor, or executed and completed by a combination of hardware and software modules in the decoding processor. The software module may be located in a mature storage medium in the art such as a random access memory, a flash memory, a read-only memory, a programmable read-only memory, an electrically erasable programmable memory, or a register, or the like. The storage medium is located in the memory, and the processor may be configured to read the information in the memory and complete the operations of the method in combination with the hardware.

It should be understood that the memory in the embodiments of the present disclosure may be a volatile memory or a non-volatile memory, or may include both volatile and non-volatile memory. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), which is configured as an external cache. By way of exemplary but not restrictive description, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DRRAM). It should be noted that the memories of systems and methods described herein are intended to include, but are not limited to, these and any other suitable types of memories.

It should be understood that the above-mentioned memories are exemplary but not restrictive. For example, the memory in the embodiments of the present disclosure may also be the SRAM, the DRAM, the SDRAM, the DDRSDRAM, the ESDRAM, the SLDRAM and the DRRAM, and so on. That is, the memory in the embodiments of the present disclosure is intended to include, but is not limited to, these and any other suitable types of memory.

Figure 9:
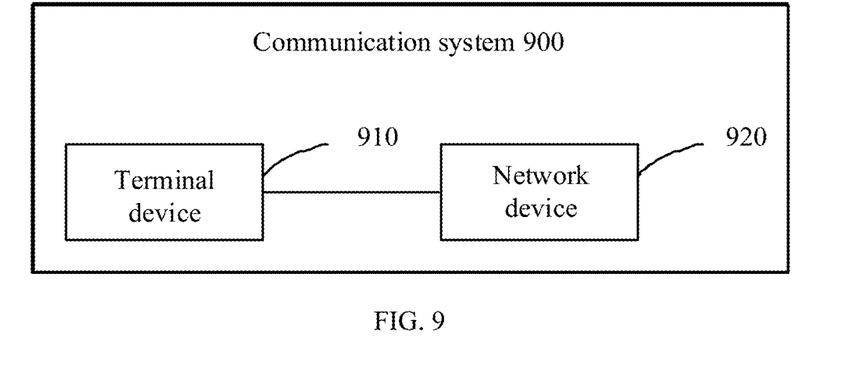
FIG. 9 is a second schematic view of a communication system architecture according to an embodiment of the present disclosure.

FIG. 9 is a schematic block diagram of a communication system 900 according to an embodiment of the present disclosure. As shown in FIG. 9, the communication system 900 includes a terminal device 910 and a network device 920.

The terminal device 910 may be configured to implement corresponding functions implemented by the UE in above methods, and the network device 920 may be configured to implement corresponding functions implemented by the network device in the above methods. For brevity, details are not described herein again. The network device may be one of the access network node and the core network device.

An embodiment of the present disclosure also provides a computer-readable storage medium for storing computer programs.

Alternatively, the computer-readable storage medium may be applied to the network device or the terminal device in some embodiments of the present disclosure. The computer program enables the computer to execute corresponding processes implemented by the network device in each method of this embodiment of the present disclosure. For the sake of brevity, the corresponding processes will not be repeated here.

An embodiment of the present disclosure also provides a computer program product, including computer program instructions.

Alternatively, the computer program product may be applied to the network device or the terminal device in this embodiment of the present disclosure, and the computer program instructions enable the computer to execute corresponding processes implemented by the network device in each method of this embodiment of the present disclosure. For the sake of brevity, the corresponding process will not be repeated here.

An embodiment of the present disclosure also provides a computer program.

Alternatively, the computer program may be applied to the network device or the terminal device in this embodiment of the present disclosure. When the computer program runs on computer, the computer executes corresponding process implemented by the network device in each method of this embodiment of the present disclosure. For brevity, the corresponding process will not be repeated here.

A reference signal configuration method is provided, the method includes: sending configuration information of one or more reference signal through system information and/or paging messages by a network device.

In some embodiments, the one or more reference signal is configured for time-frequency synchronization.

In some embodiments, the one or more reference signal is a Channel-state information (CSI)-Reference Signal (RS).

In some embodiments, the sending configuration information of one or more reference signal through system information and/or paging messages by a network device, includes: sending, by the network device, configuration information of one or more candidate reference signal through the system information; and sending, by the network device, first indication information through the paging messages; the first indication information is configured to indicate an available reference signal or an unavailable reference signal in the candidate reference signal, wherein the available reference signal is the one or more reference signal sent by the network device.

In some embodiments, the first indication information includes: a bitmap including at least one bit; every bit in the bitmap is configured to indicate a corresponding one of the one or more candidate reference signal is the available reference signal or the unavailable reference signal, respectively.

In some embodiments, the configuration information of the one or more candidate reference signal is carried by a System Information Block (SIB) in the system information.

In some embodiments, the first indication information is carried by a Downlink Control Information (DCI) carried by a Physical Downlink Control Channel (PDCCH) of a first channel configured to schedule the paging messages; or the first indication information is carried by a first channel configured to carry the paging messages.

In some embodiments, the configuration information of the one or more reference signal is carried by a first channel configured to carry the paging messages.

A reference signal configuration method is further provided, the method includes: receiving configuration information of one or more reference signal through system information and/or paging messages by a terminal device.

In some embodiments, the reference signal is a Channel-state information (CSI)-Reference Signal (RS).

In some embodiments, the method further includes: determining, by the terminal device, the one or more reference signal according to the configuration information of the one or more reference signal; performing, by the terminal device, time-frequency synchronization according to a Synchronous Signal block (SSB) and/or the one or more reference signal.

In some embodiments, the receiving configuration information of one or more reference signal through system information and/or paging messages by a terminal device, includes: receiving, by the terminal device, configuration information of one or more candidate reference signal sent by the system information; and receiving, by the terminal device, first indication information sent by the paging messages; the first indication information is configured to indicate an available reference signal or an unavailable reference signal in the one or more candidate reference signal.

In some embodiments, the method further includes: determining, by the terminal device, one or more reference signal according to configuration information of the available reference signal.

In some embodiments, the first indication information includes: a bitmap including at least one bit; every bit in the bitmap is configured to indicate a corresponding one of the one or more candidate reference signal is the available reference signal or the unavailable reference signal, respectively.

In some embodiments, the configuration information of the one or more candidate reference signal is carried by a System Information Block (SIB) in the system information.

In some embodiments, the first indication information is carried by a Downlink Control Information (DCI) carried by a Physical Downlink Control Channel (PDCCH) of a first channel configured to schedule the paging messages; or the first indication information is carried by a first channel configured to carry the paging messages.

In some embodiments, the configuration information of the one or more reference signal is carried by a first channel configured to carry the paging messages.

In some embodiments, the configuration information of the one or more reference signal is carried by a System Information Block (SIB) in the system information.

A network device is provided, the network device includes a processor; and a memory configured to store a computer program capable of being run on the processor; the processor is configured to call and run the computer program stored in the memory to execute a reference signal configuration method, and the method includes: sending configuration information of one or more reference signal through system information and/or paging messages by the network device.

A terminal device is provided, the terminal device includes a processor; and a memory configured to store a computer program capable of being run on the processor; the processor is configured to call and run the computer program stored in the memory to execute a reference signal configuration method, and the method includes: receiving configuration information of one or more reference signal through system information and/or paging messages by the terminal device.

A person of ordinary skill in the art may be aware that units and algorithm operations of examples described in combination with embodiments disclosed herein may be implemented by electronic hardware or a combination of computer software and the electronic hardware. Whether these functions are executed by hardware or software depends on the specific application and design constraint conditions of the technical solution. Professionals may use different methods for each specific application to implement the described functions, but such implementation should not be considered as going beyond the scope of the present disclosure.

Those skilled in the art may clearly understand that, for the convenience and conciseness of description, specific working processes of the above-described system, device, and unit may refer to corresponding processes in foregoing method embodiments, which is not repeated here.

In the embodiments provided by the present disclosure, it should be understood that the system, device, and method may be implemented in other ways. For example, the device described above are only illustrative. For example, a division of the units is only a logical function division, and there may be other divisions in actual implementation. For example, multiple units or components may be combined or integrated into another system, or some features can be ignored or not implemented. In addition, the displayed or discussed mutual coupling, direct coupling, or communication connection may be indirect coupling or communication connection through some interfaces, devices or units, and may be in electrical, mechanical, or other forms.

Units described as separate components may or may not be physically separated from each other, and components displayed as units may or may not be physical units. That is, they may be located in one place, or they may be distributed on multiple network units. Some or all of the units may be selected according to actual needs to achieve the objectives of the technical solutions of the embodiments.

In addition, the functional units in various embodiments of the present disclosure may be integrated into one processing unit, or each unit may exist alone physically, or two or more units may be integrated into one unit.

When the function is implemented in form of a software functional unit and sold or used as an independent product, the software functional unit may be stored in a computer readable storage medium. Based on this understanding, the technical solution of the present disclosure essentially or a part that contributes to the related art, or a part of the technical solution may be embodied in the form of a software product. The computer software product is stored in a storage medium, the storage medium includes several instructions which are configured to enable a computer device (a personal computer, a server, or a network device, and so on) to execute all or part of operations of the methods described in the various embodiments of the present disclosure. The aforementioned storage media include a U disk, a mobile hard disk, a ROM, a RAM, a magnetic disk, an optical disk, or other media that may store program codes.

Above description are only specific embodiments of the present disclosure, but does not limit the protection scope of the present disclosure. Any person skilled in the art can easily think of changes or substitutions within the technical scope disclosed by the present disclosure, and these should be covered within the protection scope of the present disclosure. Therefore, the protection scope of the present disclosure should be subject to the protection scope of claims.

What is claimed is:

1. A reference signal configuration method, comprising:
   sending configuration information of one or more reference signal through system information and/or paging messages by a network device;
   wherein the sending configuration information of one or more reference signal through system information and/or paging messages by a network device, comprises:
      sending the configuration information of the one or more reference signal through the system information and the paging messages by the network device, which comprises:
         sending, by the network device, configuration information of one or more candidate reference signal through the system information; and
         sending, by the network device, first indication information through the paging messages.

2. The method as claimed in claim 1, wherein the one or more reference signal is configured for time-frequency synchronization.

3. The method as claimed in claim 1, wherein the one or more reference signal is a Channel-state information (CSI)-Reference Signal (RS).

4. The method as claimed in claim 1,
   wherein the first indication information is configured to indicate an available reference signal or an unavailable reference signal in the candidate reference signal, wherein the available reference signal is the one or more reference signal sent by the network device.

5. The method as claimed in claim 4, wherein the first indication information comprises: a bitmap comprising at least one bit;
   wherein every bit in the bitmap is configured to indicate a corresponding one of the one or more candidate reference signal is the available reference signal or the unavailable reference signal, respectively.

6. The method as claimed in claim 4, wherein the configuration information of the one or more candidate reference signal is carried by a System Information Block (SIB) in the system information.

7. The method as claimed in claim 4, wherein the first indication information is carried by a Downlink Control Information (DCI) carried by a Physical Downlink Control Channel (PDCCH) of a first channel configured to schedule the paging messages; or
   the first indication information is carried by a first channel configured to carry the paging messages.

8. A reference signal configuration method, comprising:
   receiving configuration information of one or more reference signal through system information and/or paging messages by a terminal device;
   wherein the receiving configuration information of one or more reference signal through system information and/or paging messages by a terminal device, comprises:
      receiving the configuration information of the one or more reference signal through the system information and the paging messages by the terminal device, which comprises:
         receiving, by the terminal device, configuration information of one or more candidate reference signal sent through the system information; and
         receiving, by the terminal device, first indication information sent by the paging messages.

9. The method as claimed in claim 8, wherein the reference signal is a Channel-state information (CSI)-Reference Signal (RS).

10. The method as claimed in claim 9, further comprising:
determining, by the terminal device, the one or more reference signal according to the configuration information of the one or more reference signal; and
performing, by the terminal device, time-frequency synchronization according to a Synchronous Signal block (SSB) and/or the one or more reference signal.

11. The method as claimed in claim 8,
wherein the first indication information is configured to indicate an available reference signal or an unavailable reference signal in the one or more candidate reference signal.

12. The method as claimed in claim 11, further comprising:
determining, by the terminal device, one or more reference signal according to configuration information of the available reference signal.

13. The method as claimed in claim 12, wherein the first indication information comprises: a bitmap comprising at least one bit;
wherein every bit in the bitmap is configured to indicate a corresponding one of the one or more candidate reference signal is the available reference signal or the unavailable reference signal, respectively.

14. The method as claimed in claim 11, wherein the configuration information of the one or more candidate reference signal is carried by a System Information Block (SIB) in the system information.

15. The method as claimed in claim 11, wherein the first indication information is carried by a Downlink Control Information (DCI) carried by a Physical Downlink Control Channel (PDCCH) of a first channel configured to schedule the paging messages; or
the first indication information is carried by a first channel configured to carry the paging messages.

16. A network device, comprising:
a processor; and
a memory, configured to store a computer program capable of being run on the processor;
wherein the processor is configured to call and run the computer program stored in the memory to execute a reference signal configuration method, and the method comprises:
sending configuration information of one or more reference signal through system information and/or paging messages by the network device;
wherein the sending configuration information of one or more reference signal through system information and/or paging messages by a network device, comprises:
sending the configuration information of the one or more reference signal through the system information and the paging messages by the network device, which comprises:
sending, by the network device, configuration information of one or more candidate reference signal through the system information; and
sending, by the network device, first indication information through the paging messages.

17. A terminal device, comprising:
a processor; and
a memory, configured to store a computer program capable of being run on the processor;
wherein the processor is configured to call and run the computer program stored in the memory to execute a reference signal configuration method, and the method comprises:
receiving configuration information of one or more reference signal through system information and/or paging messages by the terminal device;
wherein the receiving configuration information of one or more reference signal through system information and/or paging messages by a terminal device, comprises:
receiving the configuration information of the one or more reference signal through the system information and the paging messages by the terminal device, which comprises:
receiving, by the terminal device, configuration information of one or more candidate reference signal sent through the system information; and
receiving, by the terminal device, first indication information sent through the paging messages.

* * * * *